R. Hoskin,
Hose Coupling,
No 34,888. Patented Apr. 8, 1862.
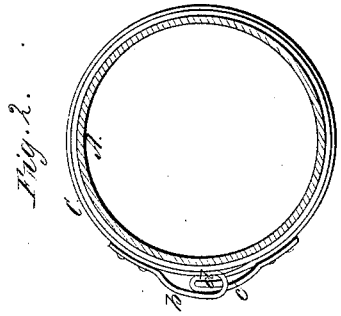
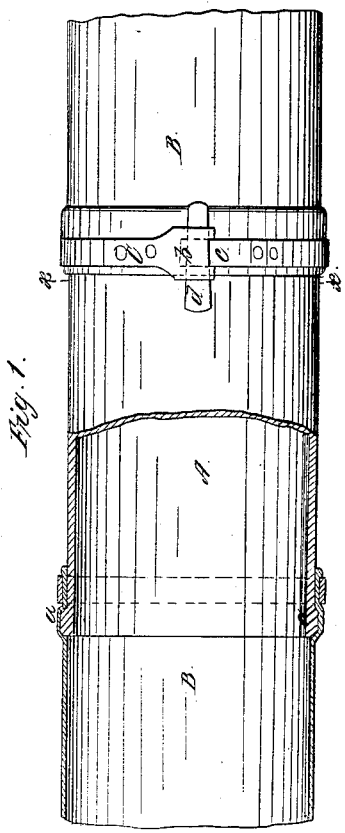
Witnesses:
J. W. Coombs
Geo. Reed
Inventor:
Richie Hoskin
per Munn & Co
Attorneys

UNITED STATES PATENT OFFICE.

RICHARD HOSKIN, OF DUTCH FLAT, CALIFORNIA.

IMPROVEMENT IN HOSE-COUPLING.

Specification forming part of Letters Patent No. 34,888, dated April 8, 1862.

*To all whom it may concern:*

Be it known that I, RICHARD HOSKIN, of Dutch Flat, in the county of Placer and State of California, have invented a certain new and Improved Hose-Coupling; and I do hereby declare the following to be a full, clear, and exact description of the same, reference being had to the accompanying drawings, making a part of this specification, in which—

Figure 1 is a plan and section of my invention, showing the manner of attaching the sections of a hose together; and Fig. 2, a transverse section of the same, taken at the line $xx$ of Fig. 1.

Similar letters of reference indicate corresponding parts in the two figures.

In hydraulic mining operations the hose generally used is of large size and of great weight, and consequently very difficult to manage. It is very desirable to have something that can be easily moved about and its length increased or decreased expeditiously.

This invention consists in a simple and efficient device for coupling short sections of a hose together, as will be hereinafter described.

To enable others skilled in the art to make and use my invention, I will proceed to describe it.

A is a metallic thimble with enlargements $a$ formed upon each end.

B B represent fragments of sections of elastic hose, which may be of rubber, canvas, or other suitable material. The ends of the hose are stretched over the enlargements on the thimble.

C is a metallic band or clasp encircling the thimble and end of the hose stretched thereon. One end of this clasp is provided with a forked head $b$ with a transverse slot passing through it. The opposite end of the said clasp is formed into a loop $c$, the opening running transversely through it. The looped end $c$ is placed between the prongs of the forked head and the two ends of the band locked together and the hose securely clamped to the thimble by driving a wedge $d$ transversely through the prongs and loop.

Among the numerous advantages of my improvement are the following: No nicely-fitting joints are required. The wear of the coupling consequent upon its long use does not affect its security. There is nothing about the coupling that is liable to get out of order. It makes a simple and efficient fastening by which the hose can be connected or disconnected very quickly.

What I claim as new and of my invention herein, and desire to secure by Letters Patent, is—

A hose-coupling consisting of the metal band or clasp C, loop $c$, and key $d$, when arranged and operating in the manner described.

RICHARD HOSKIN.

Witnesses:
   A. B. FILLMORE,
   O. B. SILVER.